US005586382A

United States Patent [19]

Ganem

[11] Patent Number: 5,586,382
[45] Date of Patent: Dec. 24, 1996

[54] RIGHT ANGLE TURNING ATTACHMENT FOR MILLING MACHINE

[76] Inventor: Charles F. Ganem, 1 Key Way P.O. Box 154, Cape Neddick, Me. 03902

[21] Appl. No.: 417,517

[22] Filed: Apr. 5, 1995

[51] Int. Cl.$^6$ .............................. B23Q 37/00; B23C 9/00
[52] U.S. Cl. .............................. 29/560; 29/27 A; 409/240
[58] Field of Search .................. 29/27 R, 27 B, 29/27 C, 560, 26 A; 409/240, 215, 165, 221, 219; 82/171, 128; 408/20

[56] References Cited

U.S. PATENT DOCUMENTS

| | | | |
|---|---|---|---|
| 647,311 | 4/1900 | Maxwell et al. | |
| 1,029,402 | 6/1912 | Ritter. | |
| 1,144,744 | 6/1915 | Wheeler | 29/27 B |
| 1,618,358 | 2/1927 | Thompson. | |
| 1,989,007 | 1/1935 | Groton. | |
| 2,318,938 | 5/1943 | Hack | 29/27 R |
| 2,341,061 | 2/1944 | Rhodes et al. | 29/27 R |
| 2,669,162 | 2/1954 | Arliss | 90/17 |
| 3,037,429 | 6/1962 | Schurger | 90/16 |
| 3,163,081 | 12/1964 | Vickers | 90/11 |
| 3,292,939 | 12/1966 | Lorenz | 279/50 |
| 3,387,638 | 6/1968 | West | 144/1 |
| 3,533,636 | 10/1970 | Fireston | 279/4 |
| 3,666,279 | 5/1972 | Coope | 279/50 |
| 3,802,713 | 4/1974 | Levy | 279/50 |
| 3,835,528 | 9/1974 | Garrett | 29/560 |
| 4,057,893 | 11/1977 | Smith et al. | 409/240 |
| 4,187,601 | 2/1980 | Aldrin | 29/560 |
| 4,627,773 | 12/1986 | Ehnert | 409/215 |
| 5,025,548 | 6/1991 | Justesen | 29/560 |
| 5,301,405 | 4/1994 | Maker | 29/26 A |

FOREIGN PATENT DOCUMENTS 2388641  12/1978  France ..................... 29/560

Primary Examiner—William R. Briggs
Attorney, Agent, or Firm—Davis and Bujold

[57] ABSTRACT

A right angled turning attachment (6) connected to the spindle (5) of a milling machine (2). The attachment provides a thru hole clamping mechanism (13) for holding and turning material (10) with various cutting tools (9) mounted in tool holders (8) fastened to the milling table (7). The attachment provides effecient turning capability to manual or computer controlled milling machines.

6 Claims, 2 Drawing Sheets

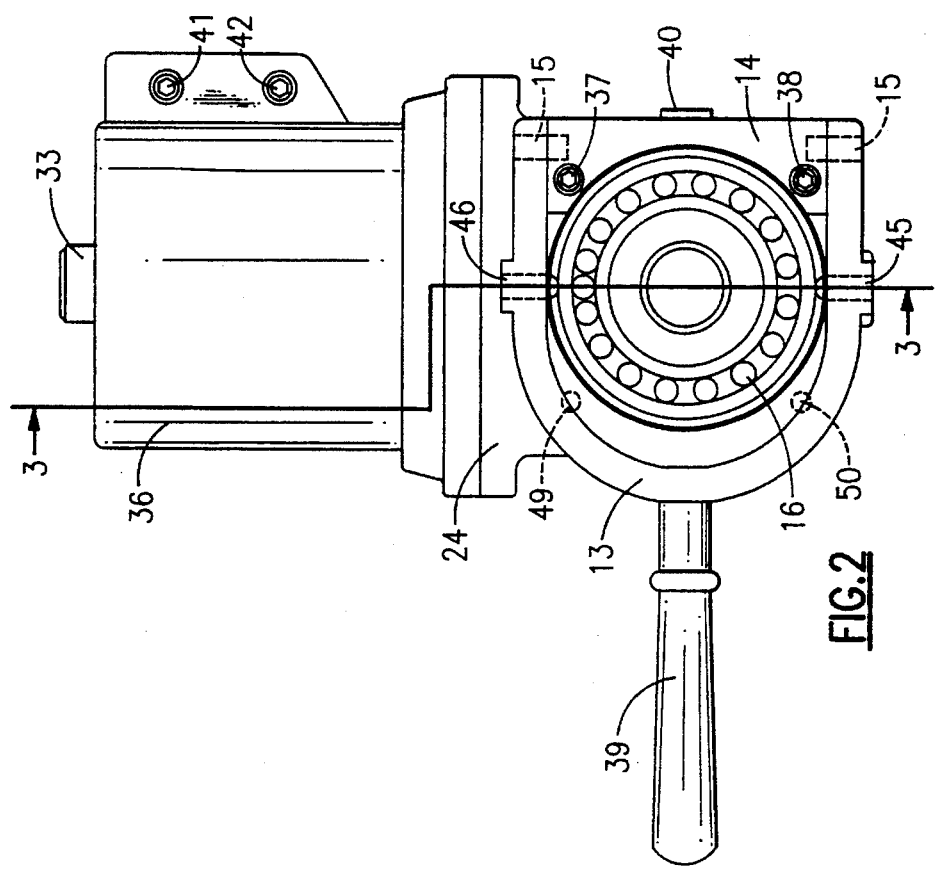
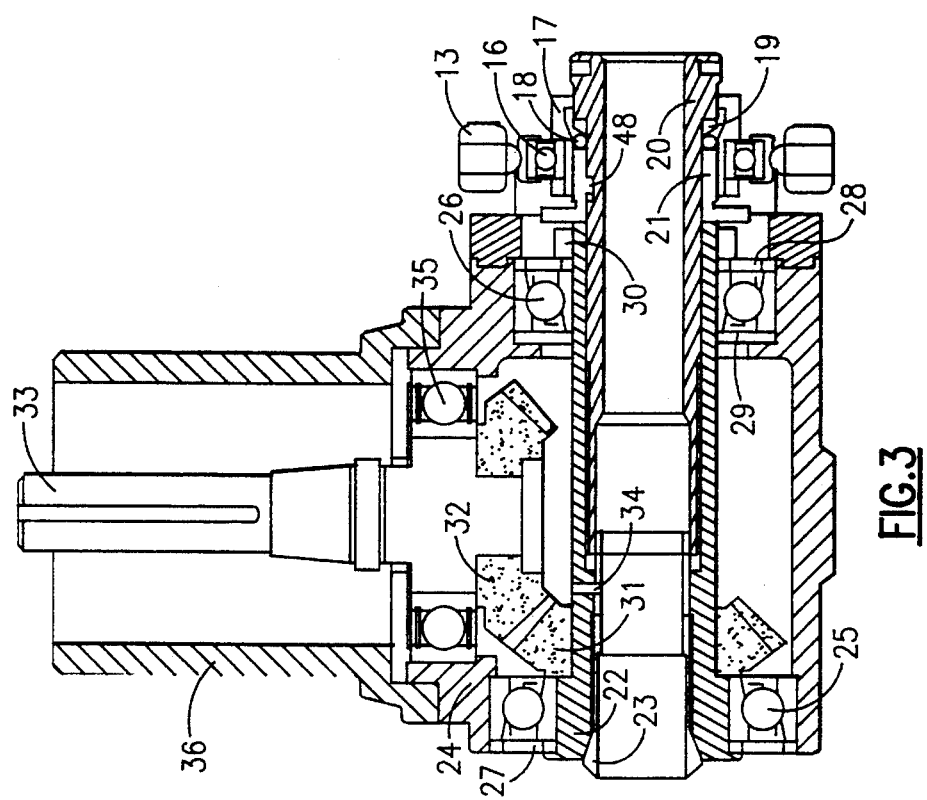

RIGHT ANGLE TURNING ATTACHMENT FOR MILLING MACHINE

BACKGROUND—FIELD OF INVENTION

This invention relates to machine tool attachments, specifically to mounting a right angle lathe turning attachment to the spindle of a vertical milling machine.

BACKGROUND—DESCRIPTION OF PRIOR ART

The lathe and the milling machine are basic to the art of machining. The lathe is designed to rotate material clamped in a spindle while a non rotating cutting tool, fixed to a slide, removes some of the material. In the case of the milling machine, the material does not rotate but is fixed to the slide or table while the cutting tool rotates in the spindle to remove some of the material. As a result, the lathe produces basically round shapes while the milling machine produces basically rectangular shapes.

Various attachments exist for the spindles of vertical milling machines which are designed to hold cutting tools such as milling cutters, drills, and other tools intended to cut the material in one way or another. The material to be machined is clamped either directly to the milling table or held in some type of holding mechanism attached to the table.

OBJECTS AND ADVANTAGES

Accordingly, several objects and advantages of my invention are that it:

Converts the spindle of a milling machine to a lathe significantly increasing the capability of the milling machine.

Provides a thru hole in the attachment for turning long parts and bar stock in a milling machine.

Effeciently clamps and unclamps material on the milling machine spindle accurately and rigidly.

Provides a substantial savings in equipment investment. Prior to my invention, computer controlled lathe work required a computer controlled lathe. Now this attachment will provide low cost computer controlled turning alternatives for many businesses which already have computer controlled milling machines but cannot justify the additional large investment in a computer controlled lathe.

This attachment can be used for turning work on manual milling machines.

This attachment provides positive location tool holding capability with faster tool changing capability compared to the present right angle tool holding attachments for milling machines.

This attachment will also hold small three and four jaw chucks with thru holes further increasing the utility value of the milling machine to do lathe work.

Still further objects and advantages will become apparent from a consideration of the ensuing description and accompanying drawings.

BRIEF DESCRIPTION OF THE DRAWINGS

FIG. 2 is a side view showing the hole thru the horizontal lathe spindle with the yoke and handle for clamping and unclamping the collet or other work holding device; and FIG. 3 is a is a detailed sectional view, along section line 3—3 of FIG. 2, showing the front of my invention.

SUMMARY

Figure 1:
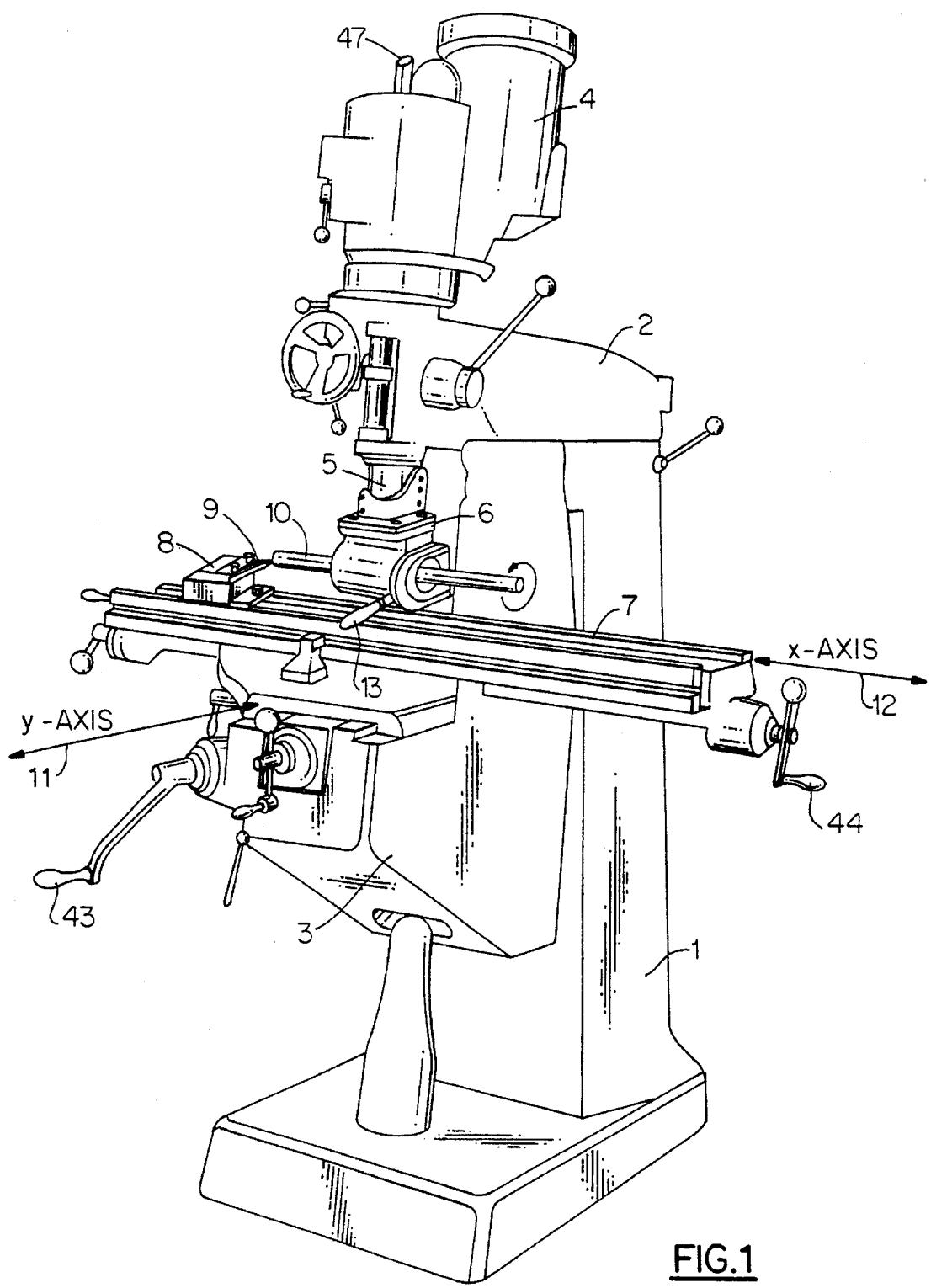
FIG. 1 is a perspective view of a milling machine with my invention installed on the vertical spindle and a lathe cutting tool mounted on the milling table.

A right angle attachment connectable to a milling machine which houses a spindle adapter, a thru hole spindle at right angles to the spindle adapter, a lever operated clamping mechanism which clamps the material to be machined in the spindle, effectively changing the milling machine spindle from a tool holding spindle to a lathe spindle, for manual or computer controlled turning work with the cutting tools mounted directly or indirectly to the milling table providing an economical alternative to manual or computer controlled lathes.

PREFERRED EMBODIMENT—DESCRIPTION

While the invention is susceptable of various and alternative constructions, a preferred embodiment has been shown in the drawings and will be described below in considerable detail. It should be understood, however, that there is no intention to limit the invention to the specific form disclosed, but on the contrary, the intention is to cover all modifications, alternative constructions and equivalents falling within the spirit and scope of the invention as expressed in the appended claims.

The right angle turning attachment embodying the present invention is particularly useful with machines known to those skilled in the art as vertical spindle milling machines.

FIG. 1 represents such a machine consisting of a base casting 1 which supports the adjustable ram 2. Attached to the top of the ram is the motor drive system 4. Extending vertically down thru the ram 2 from the drive system is the quill 5 containing the drive spindle inside. Attached to the bottom of the quill is the right angle attachment 6.

Also attached to the base of the machine is a knee 3 which slides vertically up and down by means of the handle 43. To the top of the knee 3 is attached the milling table 7 which slides horizontally by turning handle 44. Attached to the milling table is a tool block 8 and mounted to the tool block is a lathe cutting tool 9 in the relative cutting position to the material 10 which is mounted in the horizontal thru hole of the the right angle attachment 6.

FIG. 2 and FIG. 3 show the details of the invention. The use of various types of milling machine spindles adapters for certain applications and the use of various types of thru hole collets, chucks and other gripping devices for other applications are well known in the machine trades. However, the combination of the various milling machine spindle adapters, thru hole horizontal lathe type spindles and various lever operated gripping mechanisims within one housing and connectable to a milling machine spindle is new and unusual and is my invention. The details presented define one of many types which can be used with my invention.

In FIG. 2 the bore of the upper housing 36 slides over the quill 5 FIG. 1 while at the same time the drive shaft 33 feeds into the quill spindle 5. The indicating pad 40 in FIG. 2 is used to align the axis of the horizontal spindle with the x axis 12 or the y axis 11 of the milling table 7 in FIG. 1. The upper housing 36 is then clamped tight around the quill by tightening bolts 41 and 42. The draw rod 47 passes down thru the center of the milling machine spindle and threads into the center of the upper end of the drive shaft 33. In the lower housing 24 the drive shaft 33 supported by at least one bearing 35, has connected to the opposite end a drive mechanism 32 being connected to a drive mechanism 31. The horizontal thru hole lathe spindle 22 being supported by at least 2 bearings 25 and 26 are connected to the drive systems by the drive mechanism 31. The bearings 25 and 26 are preloaded with a spring washer 29 and nut 30. Inside the horizontal thru hole lathe spindle 22 is a split collect 23 containing a tapered surface on the outside which matches a tapered surface on the inside of the horizontal lathe spindle 22. The opposite end of the collet 23 contains threads on the outside which screw into threads on the inside of the drawbar 20 being assembled to the opposite end of the horizontal lathe spindle 22. Assembled to the drawbar 20 is a sliding angled sleeve 17, an annular angled ring 19, a plurality of balls 18 and a sliding collar 21. The sliding motion of the collar 21 is restricted by a perpendicular protrusion 48. Shown in FIG. 2 attached to the sliding angled sleeve 17 is a bearing 16 by pivot screws 45 and 46. The yoke 13 is also hinged to the yoke mounting block 14 with hinge pins 15.

PREFERRED EMBODIMENT—OPERATION

In operation the collet 23 is inserted into the tapered end of the horizontal lathe spindle 22 and threaded into the drawbar 20. A pin 34 prevents the collet 23 from rotating inside the horizontal lathe spindle 22. The material 10 to be machined is then inserted into the unobstructed thru hole of the horizontal lathe spindle 22. The drawbar 20 is then further screwed over the collet 23 pulling the outside taper of the collet 23 against the inside taper of the horizontal lathe spindle 22. this in turn clamps the collet 23 against the material 10 to be machined. Then finally the collet 23 is clamped even tighter against the material 10 by moving the lever 39 of the yoke in one direction to the right as can be seen in FIG. 3. This causes the sliding angled sleeve 17 attached to the inner race of the bearing 16 with the outer race pivoting on the yoke 13, forcing the plurality of balls 18 radially into the angled slot formed between the annular angled ring 19 and the sliding collar 21. As this plurality of balls 18 are forced into the angled slot, the drawbar 20 is pushed back pulling the collet 23 tighter against the inside taper of the horizontal lathe spindle 22 forcing the collet tighter against the material. When the sliding angled sleeve 17 is moved far enough past the inner angled surface until the balls 18 are trapped in the slot and against the inside diameter of the siding angled sleeve 17, this locks the clamp.

The material 10 is then rotated by the motor drive of the milling machine turning the milling machine spindle 5 which in turn rotates the drive shaft 33. Rotation of the drive shaft 33 causes rotation of the drive mechanism 31 and 32. The drive mechanism transfers the rotation at approximately 90 degrees to the horizontal lathe spindle 22 containing the material 10. The knee 3 is adjusted vertically to set the proper cutting height of the lathe tool 9. Movement along the y-axis 11 changes the diameter of the material being cut as would the cross slide of a lathe. Movement along the x-axis 12 changes the length of the turned diameter as would the carriage of the lathe.

For the convenience of the operator, the lever 39, yoke 13 and yoke mounting block 14 can be moved to other radial positions about the axis of the horizontal lathe spindle 22 by removing bolts 37 and 38 and re-positioning the yoke mounting block 14 and bolting into other mounting holes 49 and 50.

CONCLUSIONS, RAMIFICATIONS, AND SCOPE

Accordingly, it can be seen that my invention will convert the milling machine spindle to an effecient turning spindle for both manual and computer controlled machining.

Although the description above contains many specificities, these should not be construed as limiting the scope of the invention but as merely providing illustrations of some of the presently preferred embodiments of this invention. Various other embodiments and ramifications are possible within it's scope.

Thus the scope of the invention should be determined by the appended claims and their legal equivalents, rather than by the examples given.

What is claimed is:

1. A right angle drive, for converting a milling machine to a lathe, comprising:

a housing having a bore therein and a clamping means for releasably attaching said right angle drive to a milling machine;

a drive shaft having at least one bearing mounted in the housing, the drive shaft being connectable to a milling machine spindle;

a through hole spindle having at least one bearing mounted in the housing, the through hold spindle extending at a right angle to the drive shaft;

a drive mechanism connecting the drive shaft to the through hole spindle for driving the through hole spindle; and a device for holding material in the through hole spindle and for clamping and unclamping material as desired.

2. A right angle drive according to claim 1 wherein a lever and yoke assembly is provided and mountable in more than one radial position about the through hole spindle, for clamping and unclamping the material.

3. A right angle drive according to claim 1 wherein said housing comprises an upper part attached to a lower part, said upper part having a split collar which permits said right angle drive to be rotated and locked at any angular position about a quill.

4. A right angle drive according to claim 1 wherein said device for holding material comprises:

a lever operated collet chuck which receives a collet with external threads;

a taper in the through hole spindle which corresponds with a mating taper in the collet;

a collet closing drawbar which slides within the through hole spindle;

a lever operated sleeve which slides over the drawbar; and a plurality of thrust members sliding on an angled surface as the lever operated sleeve is moved axially causing the drawbar to force the collet to slide on its taper thereby one of closing and opening the collet inside diameter against the material to be machined, with the position of the lever operated sleeve relative to the angled surfaces locking the drawbar in one direction.

5. A right angle drive of claim 1 wherein the milling machine comprises a milling table movable along X and Y axes and the milling machine including cutting tools mounted on the milling table such that when the milling table is moved along at least one of its X-axis and Y-axis, controlled machining of the material is accomplished.

6. A right angle drive of claim 4 wherein said device for holding material comprises a chuck installed in the through hole spindle.

\* \* \* \* \*